No. 748,249.

Patented December 29, 1903.

UNITED STATES PATENT OFFICE.

HERMANN WINTRUFF, OF BREMEN, GERMANY.

DRY FOOD PRODUCT AND PROCESS OF MAKING SAME.

SPECIFICATION forming part of Letters Patent No. 748,249, dated December 29, 1903.

Application filed February 16, 1903. Serial No. 143,701. (No specimens.)

*To all whom it may concern:*

Be it known that I, HERMANN WINTRUFF, a resident of Bremen, German Empire, have invented certain new and useful Improvements in Dry Food Products and Processes of Making Same, of which the following is a full, clear, and exact description.

The present invention has for its object to produce a dry food principally made of potatoes, beets, or the like, having a great quantity of nourishing substances, in such a manner that all the latter remain maintained within the said material to be worked into the dry food, so that a mass will be obtained, which by the addition of fat residuums or wastes—for instance, those of the oil manufactories—may be easily enriched by further nourishing substances. In order to mix the fatty or oily substances with the potatoes, the latter must be stamped or ground into a mash. Now the difficulty arises as how to dry the potato mash, attempts having already been made to produce compact preparations of potatoes by drying, the raw potatoes being cut or ground to small pieces either without or with previous expression of the fruit-water; but in the first case it is difficult to completely dry the potato mass, which will be effected only by employing very high temperatures or by keeping the drying process alive for a certain long time, whereby the costs of the process will be considerably raised. In the other case, according to which the drying of the crushed potato mass takes place after the same has been previously freed from the fruit-water, this cannot be done without the disadvantage that simultaneously with the expression of the fruit-water certain nourishing substances of the potatoes are expressed and lost; but also the previous addition to the potato mass to be dried of those materials which have been employed up till now in similar cases—namely, in the drying of materials containing a great quantity of water in order to suck up the latter—would not lead to the desired result—namely, to effect a quick and complete drying of the potato mass. Anyhow I have succeeded in discovering in the cork-meal a material which does away with the said difficulties and disadvantages in the process of drying the potatoes, and therefore the present invention consists in the addition of cork-meal to the mash of potatoes or the like. My attempts have proved that by the addition of cork-meal to the mass the latter will almost entirely become dry and crumbling, and that it will remain in this condition—that is to say, it will not cohere or stick together in the form of a paste—so that the whole mass may now be easily mixed throughout with fatty or oily substances. As the cork has neither any taste nor any smell whatever, the nature or peculiarity of the potatoes, beets, or the like remains under the addition of cork in a certain degree entirely unchanged.

According to the invention the process is carried out as follows: The potatoes, beets, or the like are first cleaned or washed and cut in pieces, which are brought into a device by means of which they are ground into a mash. To the said mash fine cork-meal is added in quantities of five to ten per cent. of the weight of the mash, whereby the mass, as stated, becomes and remains crumbling. Furthermore, it does not cohere or stick together, and it dries very quick. Now to this mass, being almost dry, fatty or oily substances are added—for instance ground cakes made of earth-nuts, linseed, or rape-seed, or other suitable residuum from the oil manufactories. Moreover, the usual stuffings—for instance, ground straw, hay, or the like, as well as cattle-salt—are mixed with the mass.

The adding of the further substances to the aforementioned mash takes place advantageously by means of channels in which transport screws or worms are working. By means of the latter the almost-dry mass is mixed with the additional substances and forced forward, whereupon the mash is lifted by means of elevators into drying-drums for the purpose of becoming entirely dried. The mass leaves the said drying apparatus in the form of a coarse meal, being entirely dry and durable, in the form of which it is brought directly into the trade.

Having now described my invention, what

I claim as new, and desire to secure by Letters Patent, is—

1. A process for making a dry food product which consists in first forming a vegetable mash, intimately incorporating with the latter a fine cork-meal in such percentage as to cause the mash to dry and become of a crumbling nature, introducing into the mixture when partially dry an oily substance, and finally embodying therein a fibrous substance.

2. A dry food product composed of potato mash, fine cork-meal, an oily substance, and a fibrous substance.

In witness whereof I have hereunto set my hand in presence of two witnesses.

HERMANN WINTRUFF.

Witnesses:
F. A. BRYCE,
G. HOYERMANN.